United States Patent [19]

Pettersson

[11] Patent Number: 4,681,487
[45] Date of Patent: Jul. 21, 1987

[54] INSERT FOR CHIP REMOVING MACHINING

[75] Inventor: Lars T. Pettersson, Gävle, Sweden

[73] Assignee: Santrade Limited, Lucerne, Sweden

[21] Appl. No.: 880,017

[22] Filed: Jun. 30, 1986

[30] Foreign Application Priority Data

Jul. 3, 1985 [SE] Sweden ............................... 8503305

[51] Int. Cl.$^4$ .............................................. B23B 27/22
[52] U.S. Cl. ..................................... 407/114; 407/113
[58] Field of Search ................. 407/113, 114, 115, 116

[56] References Cited

U.S. PATENT DOCUMENTS

| | | | |
|---|---|---|---|
| 3,694,879 | 10/1972 | Kennicott et al. | 407/66 |
| 3,733,664 | 5/1973 | McKelvey | 407/114 |
| 3,786,540 | 1/1974 | Lundgren | 407/114 |
| 4,059,363 | 11/1977 | Romagnolo | 407/114 |
| 4,087,192 | 5/1978 | Hertel | 407/114 |
| 4,486,127 | 12/1984 | Eckle | 407/114 |

FOREIGN PATENT DOCUMENTS

| | | | |
|---|---|---|---|
| 2162682 | 7/1973 | Fed. Rep. of Germany | 407/114 |
| 2407379 | 9/1974 | Fed. Rep. of Germany | 407/114 |
| 2525902 | 1/1976 | Fed. Rep. of Germany | . |
| 2940328 | 4/1980 | Fed. Rep. of Germany | . |
| 1295438 | 11/1972 | United Kingdom | 407/114 |

Primary Examiner—M. Jordan
Assistant Examiner—Jerry Kearns
Attorney, Agent, or Firm—Burns, Doane, Swecker & Mathis

[57] ABSTRACT

The invention relates to an insert, preferably for turning. The insert, which has a triangular basic shape, has three chip breakers in its upper flat face. A cutting edge is formed at the intersection line between a chip breaker and an edge surface. The chip breaker is formed with a conical rake face inside an associated nose portion. The chip breaker consists of an outer part and an inner part. The inner part is mainly planar and its termination at the nose portion deviates from the general direction of the inner part in order to guide and control chips during finishing.

10 Claims, 11 Drawing Figures

INSERT FOR CHIP REMOVING MACHINING

BACKGROUND OF THE INVENTION

The present invention relates to an insert for chip removing machining. The insert comprises a mainly polygonal body of hard, wear resistant material which has an upper face and a lower face arranged in separate, mainly parallel planes and a plurality of side faces connecting said faces. At least one chip breaker is assymmetrically arranged in at least one of the upper or lower faces and at least one nose portion provided with a cutting edge. The chip breaker consists of an outer part and an inner part, said outer part forming a cutting edge at the intersection of a first side face. The end of the inner part in the vicinity of the nose portion deviates from the main direction of the inner part such that the distance between the end and the connected cutting edge or its extension line in a plane, parallel with the lower face, increases with diminishing distance to a second side face. The cutting edge, the nose portion and the edge of the nose portion are arranged at a distance from the associated upper or lower face.

Hitherto known inserts for chip removing machining have chip breakers at the rake face, which have an extension along the cutting edge in direction from one cutting corner towards an adjacent cutting corner. One end of the chip breaker starts off in a side face of the insert such that the minimum point in the side face will lie below the highest point of the associated nose portion. Thus, the cutting corner will achieve a neutral or negative cutting geometry around the minimum point of the chip breaker in the side face, said cutting geometry transferring into positive the closer to the longitudinal cutting edge the rake angle is measured. The negative cutting geometry results in that the cutting forces acting upon the work piece and the insert become larger and therefore the insert risks breaking. Furthermore, the inner part of the chip breaker, as a whole, has a straight extension which means that the insert during small feed rates and cutting depths, when mainly only the nose portion works, does not form the chips in a satisfactory manner. The chips cut in that manner by the conventional insert achieve a large radius of curvature and a steep pitch and therefore they have a tendency to coil around the work piece and insert and therefore risk to damage these especially during turning of tough work material having a low carbon content.

The invention is intended to provide an insert having a shape avoiding the above-mentioned drawbacks.

THE DRAWINGS

The invention will be more closely described hereinafter with reference to the appended drawings wherein.

DESCRIPTION OF A PREFERRED EMBODIMENT OF THE INVENTION

Figure 1:
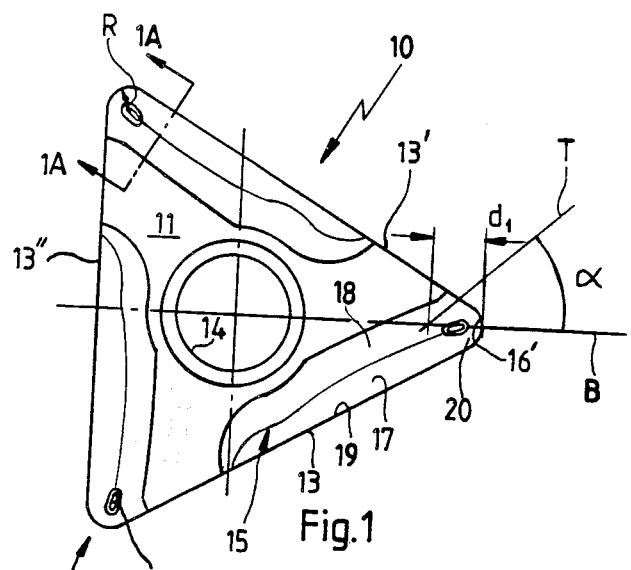
FIG. 1 shows a triangular insert according to the invention in top view.
Figure 1A:
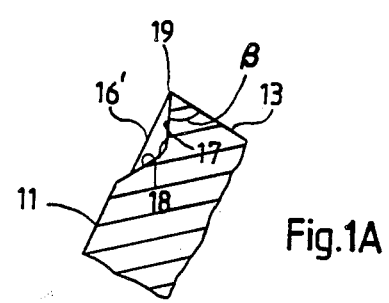
FIG. 1A shows the insert in cross-section according to the line 1A—1A in FIG. 1.
Figure 2:
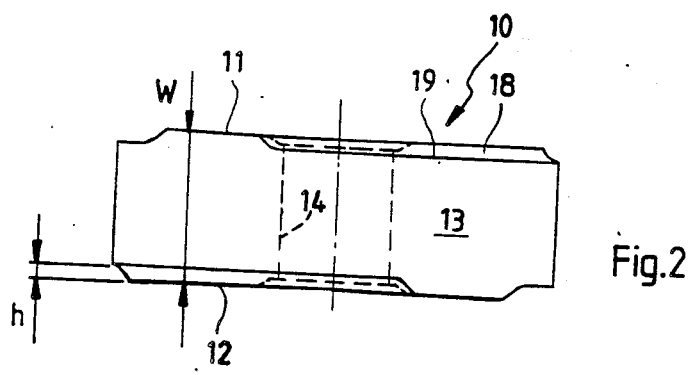
FIG. 2 shows the insert in side view.

FIGS. 1, 1A and 2 show an indexable insert according to the invention, preferably for turning. The insert 10 has a triangular basic shape comprising an upper face 11 and a lower face 12 arranged in separate, mainly parallel planes and three side faces 13, 13', 13" connecting them. The side faces 13, 13', 13" connect the upper and lower faces mainly perpendicularly. The insert 10 consists of a hard, wear resistant material, such as hard metal. The insert is provided with a central hole 14 to receive a fastening mechanism. Three chip breakers 15 are formed in the upper face 11. Each chip breaker 15 extends along the associated side face. A cutting corner is arranged at the intersection of two side faces. Each cutting corner has a rounded-off nose portion 16. The cutting edges 16' of the three nose portions extend along a plane which is parallel with the upper and lower faces.

The chip breaker 15 extends in direction from the nose portion 16 towards an adjacent nose portion. The chip breaker consists of an outer part 17 and an inner part 18. The outer part 17 forms a cutting edge 19 along the intersection line with the associated side face 13. The outer part, which is mainly planar, slopes inwardly and downwardly towards the center of the insert 10. The inner part 18, which is mainly planar, climbs upwardly from the inner termination of the outer part 17 towards the upper face 11. The end surface 18' of the inner part is broken from the bisector B of the nose portion 16. The end surface 18' is mainly planar and, in top view, a line along or a tangent T to the end surface 18' forms an acute angle $\alpha$ with the bisector B. The angle $\alpha$ is between 15° and 60°. The tangent T intersects the bisector B inside the center of the nose radius at a distance $d_1$ from the outermost point of the nose portion 16. The distance $d_1$ is larger than the nose radius R.

The thickness w of the insert is larger than the thickness of conventional inserts for corresponding machining. The reason for this is that the cutting edges 19, 16' shall be arranged at a standard height at the same time as material is required in the thickness direction to form the climbing inner part 18 of the chip breaker. The perpendicular distance h between the plane of the cutting edges and an associated upper face 11 is ½ to 1/15 times the thickness w of the insert, preferably ⅛ to 1/12. The cutting edges 16', 19 lie in a common plane mainly parallel with the upper or lower faces.

Thus, the inner part 18 of the chip breaker 15 and its end 18' are arranged partly above the plane defined by the cutting edges 16', 19.

A conical rake face 20 is formed radially inside the edge 16', formed like an arch of a circle, of the nose portion 16'. The axis of the rake face is mainly perpendicular to the upper face 11. The line of intersection between the rake face and two side faces forms the edge 16' having the shape of an arch of a circle. The rake face 20 forms a constant, acuate edge angle $\beta$ with the side face 13. The edge angle $\beta$ increases continously with the climbing of the end surface 18' towards the upper face 11, seen in a cross-section perpendicular to the edge 16'. The edge angle β may also increase discontinuously.

A projection 21 is formed at and around the center of the nose radius. The projection 21 has an oblong shape and extends in a direction mainly parallel with the cutting edge 19. The projection is intended to support the chip during a small cutting depth and small feed rate such that the chip does not abut against the bottom area of the chip breaker 15 and thereby functions as a primary chip breaker.

Figure 3:
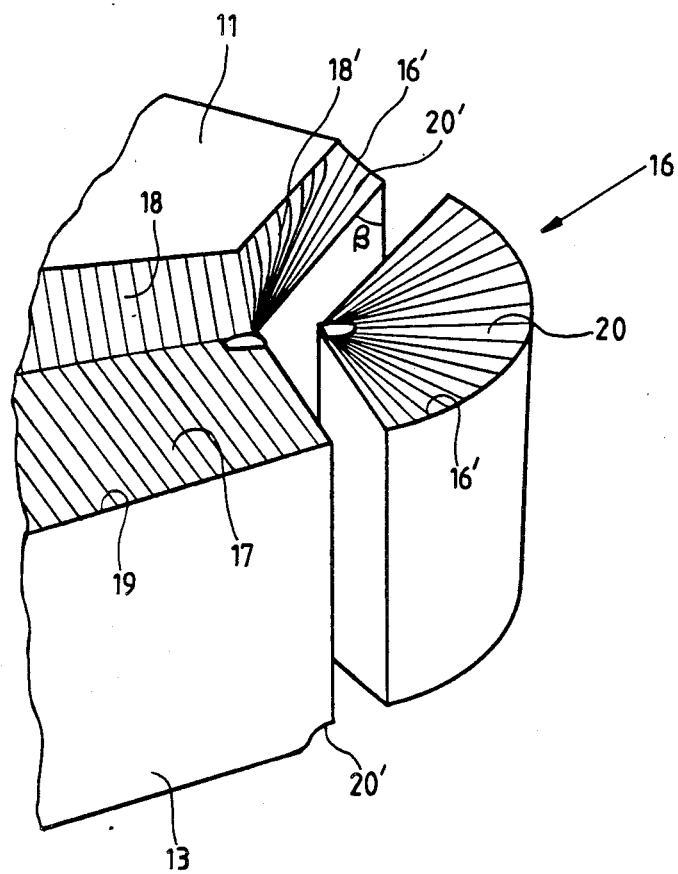
FIG. 3 shows a part of the insert in perspective view.

FIG. 3 shows one cutting corner of the insert 10 in a perspective view. A cutting tip unit, for illustration purposes only, is shaped as a rounded-off pyramid. The cutting edge 16' of the nose portion 16 is formed like an arch of a circle and lies in a single plane common to the cutting edges of all nose portions. The rake face 20 slopes downwardly and inwardly and therefore the cutting edge 16' cuts the work piece with a positive rake angle. The rake face 20 smoothly connects to the end surface 18' of the inner part 18 via the surface 20'.

Figure 4:
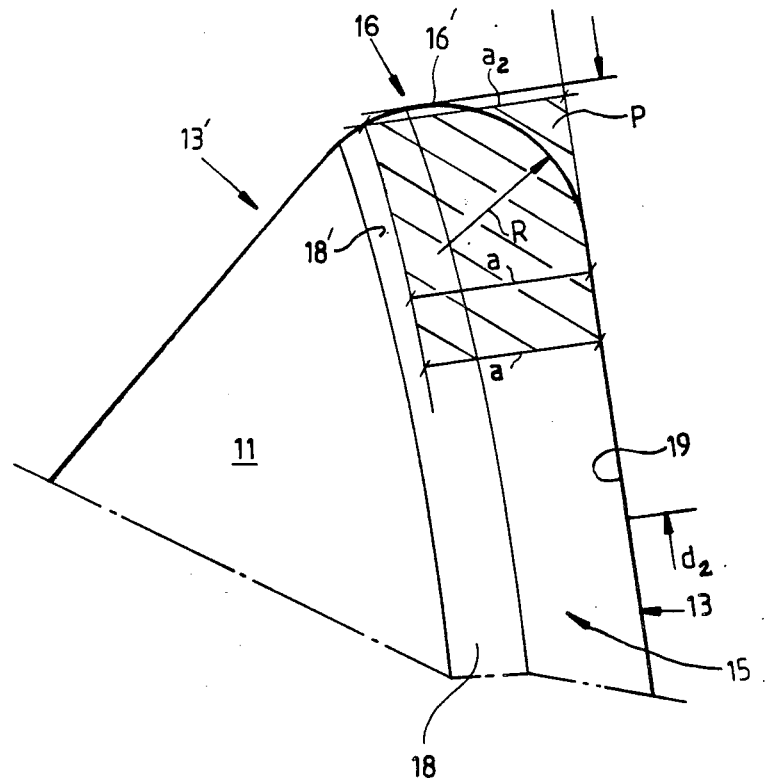
FIG. 4 shows a part of the insert in top view.

FIG. 4 shows a part of an alternative embodiment of an insert according to the invention, in a top view. In this embodiment the end surface 18' of the inner part 18 of the chip breaker 15 bends away from the main direction of the inner part. The chip breaker 15 lacks the earlier described projection since the chip breaker is somewhat narrower in this embodiment. The parts of the inserts similar to the ones of the earlier described insert have been depicted with the same reference symbols. The end surface 18' of the inner part 18 of the chip breaker 15 deviates from the main direction of the inner part in the vicinity of the nose portion 16 such that the distance a between the end surface 18' and the cutting edge 19 in a plane P increases when the end surface 18' approaches the side face 13'. The plane P is defined as the plane in which the edge 16' of the nose portion 16 lies. By the expression "in the vicinity of" is meant that the end surface 18' starts deviating from the main direction of the inner part 18 at a distance $d_2$ which is the perpendicular distance from the edge 16' of the nose portion 16 along the extension line of the edge 19 and which is less than the length of four nose radii R. The distance $a_1$ is measured perpendicularly from the cutting edge 19 to the end surface 18' in the plane P and the distance $a_2$, which is larger than $a_1$, is measured perpendicularly from the extension line of the cutting edge 19 to the end surface 18' in the plane P closer to the nose portion.

Figures 5, 6:
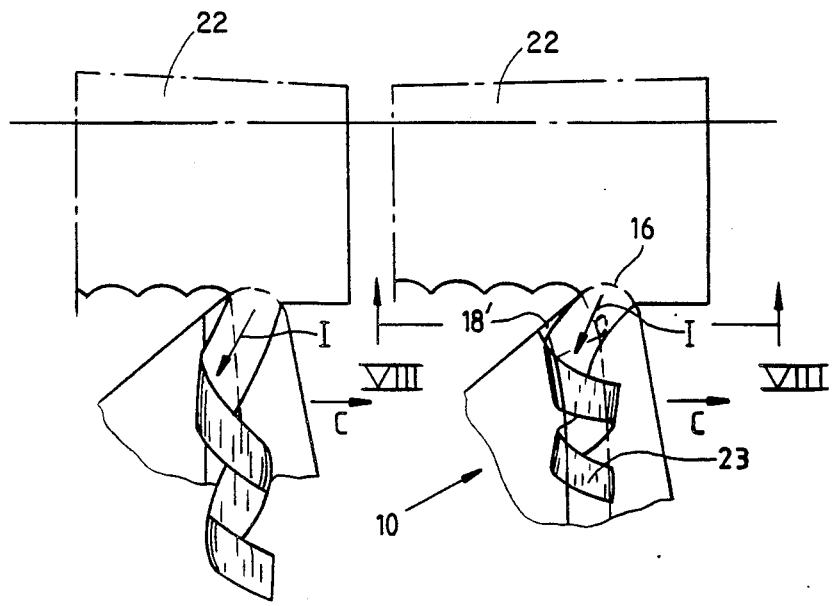
FIG. 5 shows a conventional insert in top view during a finishing operation in a work piece.
FIG. 6 shows a part of the insert according to the invention in top view, in engagement with a work piece during a finishing operation.

FIG. 5 shows a part of a conventional insert during finishing of a work piece 22, a low carbon containing steel, for example, giving long chips and being difficult to break. The insert is fed in the direction of the arrow C. The feed rate and the cutting depth are small. A narrow and long chip is generated at the nose portion. The initial direction I of the chip flow mainly coincides with the bisector of the cutting corner. The inner part of the chip breaker extends mainly perpendicularly to the center axis of the work piece and therefore the chip achieves a small deformation and thus a large radius of curvature and a large helix angle. The shape of the chip causes it to be thrown uncontrolled around insert and work piece which can damage them.

FIG. 6 shows a part of the insert 10 according to the invention during turning of a work piece 22. The insert is fed in the direction of the arrow C. The feed rate and the cutting depth are small and therefore the insert performs a finishing operation. A narrow chip 23 is generated by the edge 16' of the nose portion. The chip is broken by the inner end 18' of the chip breaker, the main extension of said end forming an acute angle with the center axis of the work piece. The chip 23 achieves a substantial deformation and thus a small radius of curvature and a small helix angle and therefore the chip becomes stiff and flows in a controlled manner.

Figure 7:
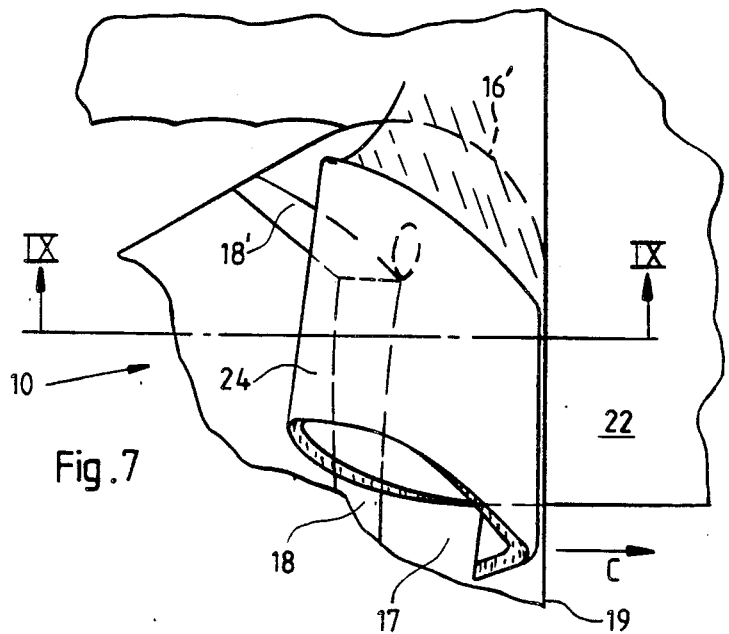
FIG. 7 shows a part of the insert, in top view, in engagement with a work piece during roughing.

FIG. 7 shows the insert 10 during roughing. The insert cuts the chip 24 in a known way, said chip 24 being formed and broken against the inner part 18 of the chip breaker. The end surface 18' does not give any essential contribution to the forming of the chip during this machining. The feed direction is given by the arrow C.

Figure 9:
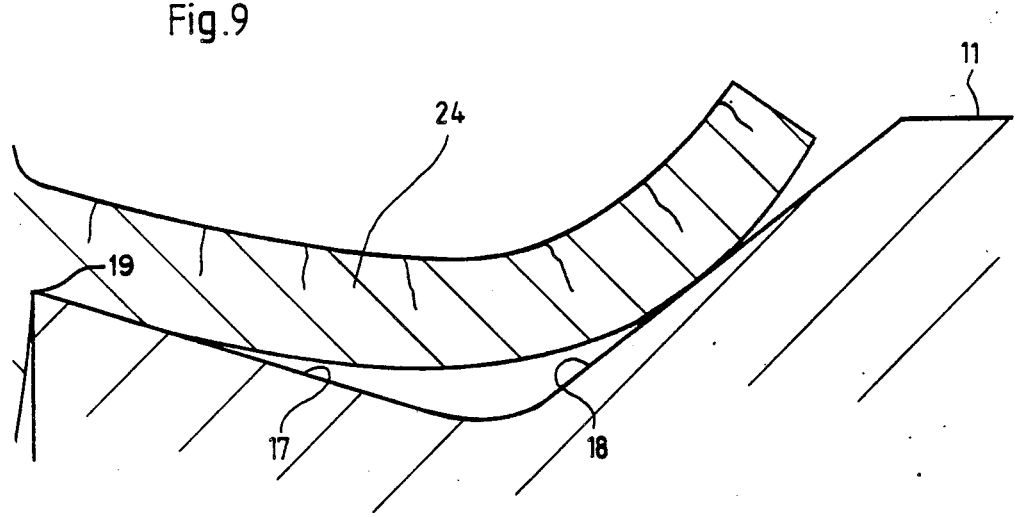
FIGS. 8 and 9 show cross-sections at the insert according to the line VIII—VIII in FIG. 6 respective according to the line IX—IX in FIG. 7.
Figure 8:
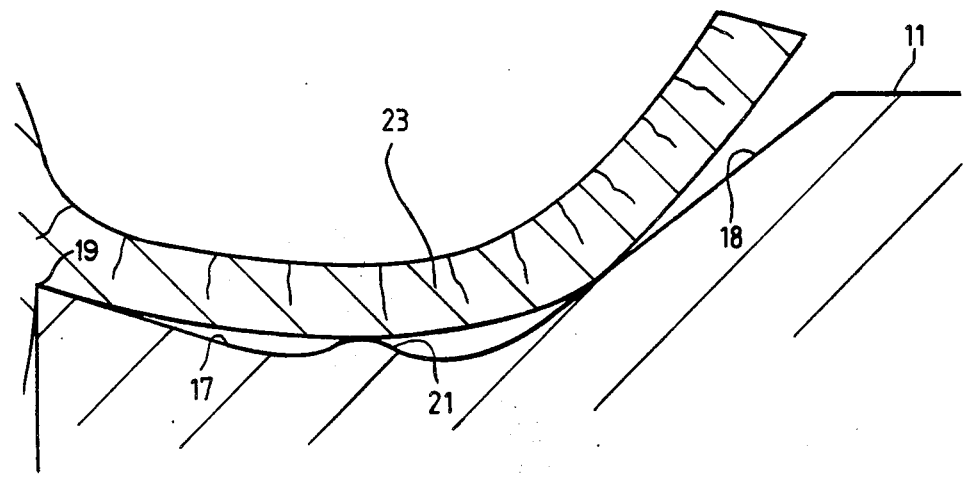

FIGS. 8 and 9 show cross-sections according to the line VIII—VIII in FIG. 6 respective the line IX—IX in FIG. 7. FIG. 8 shows the formation of the narrow chip 23 against the parts of the chip breaker. The chip 23 is cut by the edge 19 and follows the outer part of the chip breaker a short distance which is determined by the protrusion of the projection 21. The chip 23 is guided against the end surface 18' where it is additionally bent and is guided away from the machining area. FIG. 9 shows the coarse chip 24 which is cut by the edge 19. The chip 24 follows the outer part 17 a distance which is determined by the steepness of the inner part whereafter the chip 24 is bent against the inner part and is guided away.

Figure 10:
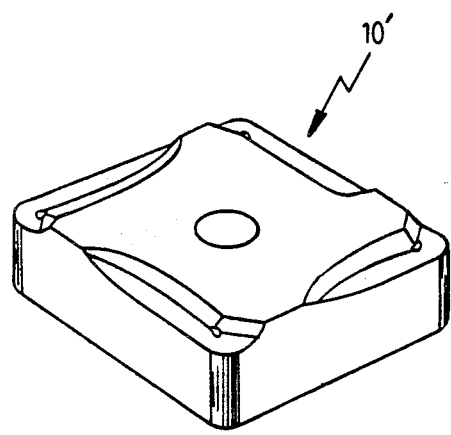
FIG. 10 shows an alternative embodiment of an insert according to the invention.

In FIG. 10 is shown a square insert 10' according to the invention. The insert is provided with four cutting portions and four chip breakers. The cutting portions are mainly identical with the cutting portions of the first described insert.

The invention is not limited to triangular or square inserts since a plurality of polygonal shapes are possible, for example rhombical basic shapes. The projection 21 improves the chip forming characteristics of the insert but can be dispensed with in certain cases.

Thus the present invention relates to an insert whose shape is such that it both can perform finishing and roughing of work pieces yet retaining excellent chip control also at tough work materials having a low carbon content.

What is claimed is:

1. Insert for chip removing machining, preferably for turning, comprising a mainly polygonal body of hard, wear resistant material, which has an upper face and a lower face arranged in separate mainly parallel planes and a plurality of side faces connecting said faces, at least one chip breaker asymmetrically arranged in at least one of the lower or upper faces, at least one rounded-off nose portion at the intersection of two side faces, said portion being provided with a cutting edge, said chip breaker consisting of an outer part and an inner part, said outer part forming a cutting edge at the intersection with a first side face, characterized in that the end surface of the inner part deviates from the main direction of the inner part in the vicinity of the nose portion such that the distance between the end surface and an associated cutting edge or its extension line in a plane P parallel with the lower face increases with diminishing distance to a second side face and in that the cutting edge, the nose portion and the cutting edge of the nose portion are arranged at a distance from the associated upper or lower face, said cutting edges lying in a common plane mainly parallel with the plane P.

2. Insert according to claim 1, characterized in that the nose portion, its edge and the cutting edge are arranged in the plane P and in that the distance between the plane P and the plane of the upper face is between ½ to 1/15 of the thickness of the insert, preferably ⅛ to 1/12.

3. Insert according to claim 1, characterized in that the inner part of the chip breaker is mainly planarly shaped, the end surface of said inner part deviating, in the vicinity of the nose portion, from the main direction of the inner part such that a tangent to said end surface intersects the bisector of the nose portion at a distance, from the outermost point of the nose portion, which is larger than the radius of the nose.

4. Insert according to claim 1, characterized in that the chip breaker and the first and second side faces, perpendicularly to the cutting edge encloses an acute edge angle which increases between the nose portion and the upper face such that the distance from the cutting edge of the nose portion to the plane of the upper face diminishes.

5. Insert according to claim 1, characterized in that the end surface of the inner part deviates from the main direction of the inner part at a distance from the center of the nose radius which is less than four nose radii.

6. Insert according to claim 3, characterized in that the chip breaker at the nose portion has a conical surface whose axis is mainly perpendicular to the upper face, the line of intersection between said conical surface and two side faces forming a cutting edge shaped as an arch of a circle, said conical surface forming a constant, positive rake angle with the plane in which the edge lies.

7. Insert according to claim 4, characterized in that said edge angle increases continuously at the transition between the nose portion and the upper face.

8. Insert according to claim 4, characterized in that said edge angle increases discontinuously at the transition between the nose portion and the upper face.

9. Insert according to claim 1, characterized in that the cutting edge, extends from one nose portion in direction towards another adjacent nose portion, the chip breaker extending along said cutting edge and from that edge in direction towards the center of the insert said chip breaker having, in cross-section, an outer part adjacent to respective cutting edge, which climbs upwardly from the inner end of the outer part towards said upper face, the outer part of said chip breaker is, in cross-section, provided with a mainly constant edge angle in direction from one short end of the chip breaker towards its other short end.

10. Insert according to claim 1, characterized in that a projection is formed in the chip breaker in the center of the nose radius, said projection being arranged at and around the minimum point of the chip breaker and in that the insert is shaped as a polygonal indexable cutting insert.

* * * * *